(12) United States Patent
Ueki (10) Patent No.: US 8,917,915 B2
(45) Date of Patent: Dec. 23, 2014

(54) HEAD DETECTING METHOD, HEAD DETECTING APPARATUS, ATTRIBUTE DETERMINING METHOD, ATTRIBUTE DETERMINING APPARATUS, PROGRAM, RECORDING MEDIUM, AND ATTRIBUTE DETERMINING SYSTEM

(75) Inventor: Kazuya Ueki, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 158 days.

(21) Appl. No.: 13/807,677

(22) PCT Filed: May 12, 2011

(86) PCT No.: PCT/JP2011/060981
§ 371 (c)(1),
(2), (4) Date: Dec. 28, 2012

(87) PCT Pub. No.: WO2012/002048
PCT Pub. Date: Jan. 5, 2012

(65) Prior Publication Data
US 2013/0114889 A1 May 9, 2013

(30) Foreign Application Priority Data
Jun. 30, 2010 (JP) ................................. 2010-149934

(51) Int. Cl.
*G06K 9/00* (2006.01)
*G06K 9/62* (2006.01)
*G06T 7/00* (2006.01)

(52) U.S. Cl.
CPC ............ *G06K 9/6262* (2013.01); *G06T 7/0044* (2013.01); *G06T 2207/30201* (2013.01); *G06T 2207/30232* (2013.01); *G06T 2207/10004* (2013.01)
USPC ............ 382/118; 382/155; 382/159; 382/160

(58) Field of Classification Search
CPC .......... G06K 9/00221; G06K 9/00228; G06K 9/00275; G06K 9/6267; G06K 9/627
USPC .................. 382/118, 155, 159, 160
See application file for complete search history.

(56) References Cited

U.S. PATENT DOCUMENTS
7,583,294 B2 * 9/2009 Ray et al. ................... 348/222.1
(Continued)

FOREIGN PATENT DOCUMENTS
CN 101021870 A 8/2007
JP 3810943 B2 8/2006
(Continued)

OTHER PUBLICATIONS
Rowley, H.A; Baluja, S.; Kanade, T., "Neural network-based face detection," Computer Vision and Pattern Recognition, 1996. Proceedings CVPR '96, 1996 IEEE Computer Society Conference on , vol., no., pp. 203,208, Jun. 18-20, 1996.*
Zuo, Fei & With, P.H.N. de. "Cascaded face detection using neural network ensembles". EURASIP Journal on Advances in Signal Processing, 2008.*

(Continued)

*Primary Examiner* — Utpal Shah
(74) *Attorney, Agent, or Firm* — Sughrue Mion, PLLC (57) ABSTRACT

The present invention is to provide a head detecting method for detecting the head in an image correctly at high speed.
The head detecting method of the present invention using: a preliminary head detection model acquired with images each containing at least a part of a head in a defined image region defined preliminarily as positive examples and with images each not containing a head in the defined image region as negative examples; and a definitive head detection model acquired with images each containing a head in a state where it matches preliminarily defined position and size as positive examples and with images each containing a head in a state where it does not match at least one of the preliminarily defined position and size as negative examples, the method includes:
    an image acquiring step of acquiring an image to be detected;
    a preliminary head detecting step of cutting out the defined image region as an image patch and detecting head images by referring to the preliminary head detection model; and
    a definitive head detecting step of detecting a definitive head image from acquired plural head images by referring to the definitive head detection model.

12 Claims, 8 Drawing Sheets

(56) References Cited

U.S. PATENT DOCUMENTS

| | | | |
|---|---|---|---|
| 7,783,082 B2* | 8/2010 | Koshizen et al. | 382/118 |
| 7,889,892 B2* | 2/2011 | Terakawa | 382/118 |
| 7,907,774 B2* | 3/2011 | Parr et al. | 382/154 |
| 8,457,365 B2* | 6/2013 | Nonaka et al. | 382/118 |
| 2006/0104517 A1* | 5/2006 | Ko et al. | 382/209 |
| 2006/0126964 A1* | 6/2006 | Chen | 382/286 |
| 2007/0071319 A1* | 3/2007 | Fukushima | 382/173 |
| 2008/0091627 A1 | 4/2008 | Hosoi et al. | |
| 2012/0230545 A1* | 9/2012 | Zhang et al. | 382/103 |

FOREIGN PATENT DOCUMENTS

| | | |
|---|---|---|
| JP | 2009-59047 A | 3/2009 |
| WO | 2006/073081 A1 | 7/2006 |
| WO | 2010/032298 A1 | 3/2010 |

OTHER PUBLICATIONS

Communication dated Oct. 10, 2014, issued by the State Intellectual Property Office of P.R. China in counterpart Chinese application No. 201180032670.6.

* cited by examiner

HEAD DETECTING METHOD, HEAD DETECTING APPARATUS, ATTRIBUTE DETERMINING METHOD, ATTRIBUTE DETERMINING APPARATUS, PROGRAM, RECORDING MEDIUM, AND ATTRIBUTE DETERMINING SYSTEM

CROSS REFERENCE TO RELATED APPLICATIONS

This application is a National Stage of International Application No. PCT/JP2011/060981 filed May 12, 2011, claiming priority based on Japanese Patent Application No. 2010-149934 filed Jun. 30, 2010, the contents of all of which are incorporated herein by reference in their entirety.

TECHNICAL FIELD

The present invention relates to a head detecting method, a head detecting apparatus, an attribute determining method, an attribute determining apparatus, a program, a recording medium, and an attribute determining system.

BACKGROUND ART

The technique of detecting a person in an image using a pattern recognition is performed by detecting, for example, a part of the face (for example, the eyes, nose, and mouth), the head, and the color of skin (for example, see Patent Document 1). In the detection of a person of this type, generally, it is determined whether or not the image is of the head and the like by performing scanning in such a manner that an image patch of a predetermined region is finely shifted with respect to image data to be detected (original image). The aforementioned determination is performed, for example, by referring to an image for learning acquired preliminarily.

RELATED ART DOCUMENT

Patent Document

[Patent Document 1] Japanese Patent No. 3810943

SUMMARY OF INVENTION

Problem to be Solved by the Invention

Figure 7:
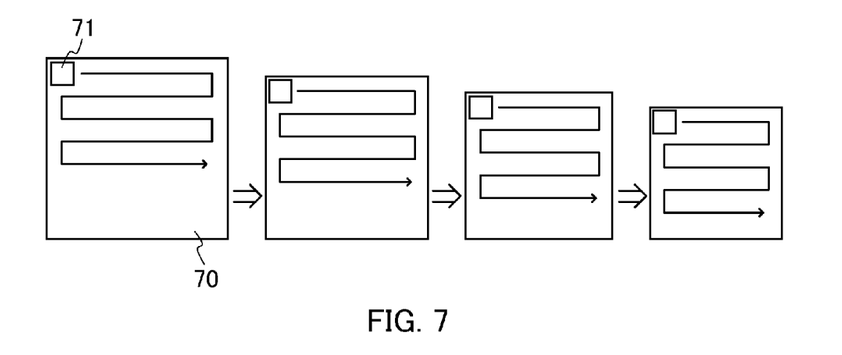
FIG. 7 is a view showing an example of a method of detecting the head in a related art.

The learning is performed with an image in which the head of predetermined position and size is shown in an image patch as a positive example of the head image and with an image in which the position or the size of the head differs from the predetermined position and size in the image patch as a negative example. For example, as shown in FIG. 7, the size of an original image (image to be detected) 70 can be changed in stages, and the scanning is performed for every size. In this case, by searching the head by reducing the size of the original image 70 as well as moving an image patch 71, the heads of various sizes can be detected.

However, with respect to this method, there is a possibility of missing the head unless the image patch 71 is moved little by little but a processing time for detection increases when the patch is moved finely. Also with respect to the size of an original image, there is a possibility of missing the head unless the size of the original image is reduced little by little but a processing time for detection increases also when the original image is reduced little by little.

Hence, the present invention is intended to provide a head detecting method, a head detecting apparatus, an attribute determining method, an attribute determining apparatus, a program, a recording medium, and an attribute determining system for detecting the head in an image correctly at high speed.

Means for Solving Problem

In order to achieve the aforementioned object, the head detecting method of the present invention using: a preliminary head detection model acquired with images each containing at least a part of a head in a defined image region defined preliminarily as positive examples and with images each not containing a head in the defined image region as negative examples; and a definitive head detection model acquired with images each containing a head in a state where it matches preliminarily defined position and size in the defined image region as positive examples and with images each containing a head in a state where it does not match at least one of the preliminarily defined position and size in the defined image region as negative examples, the method includes:

an image acquiring step of acquiring an image to be detected;
a preliminary head detecting step of cutting out the defined image region of the image to be detected as an image patch and detecting head images from the image to be detected by referring to the preliminary head detection model; and
a definitive head detecting step of detecting a definitive head image from plural head images acquired in the preliminary head detecting step by referring to the definitive head detection model.

The head detecting apparatus of the present invention includes:

a preliminary head detection model acquired with images each containing at least a part of a head in a defined image region defined preliminarily as positive examples and with images each not containing a head in the defined image region as negative examples;
a definitive head detection model acquired with images each containing a head in a state where it matches preliminarily defined position and size in the defined image region as positive examples and with images each containing a head in a state where it does not match at least one of the preliminarily defined position and size in the defined image region as negative examples;
an image acquiring unit for acquiring an image to be detected;
a preliminary head detecting unit for cutting out the defined image region of the image to be detected as an image patch and detecting head images from the image to be detected by referring to the preliminary head detection model; and
a definitive head detecting unit of detecting a definitive head image from plural head images acquired by the preliminary head detecting unit by referring to the definitive head detection model.

The attribute determining method of the present invention includes:

a head detecting step of detecting a head by the head detecting method according to the present invention; and
an attribute determining step of determining an attribute based on an image of the head.

The attribute determining apparatus of the present invention includes:

a head detecting unit for detecting a head by the head detecting apparatus according to the present invention; and
an attribute determining unit for determining an attribute based on an image of the head.

The program of the present invention causes a computer to execute at least one of the head detecting method of the present invention and the attribute determining method of the present invention.

The recording medium of the present invention is recorded with the program according to the present invention.

The attribute determining system of the present invention includes:
an image acquiring unit for acquiring an image to be detected,
a preliminary head detection model acquired with images each containing at least a part of a head in a defined image region defined preliminarily as positive examples and with images each not containing a head in the defined image region as negative examples;
a definitive head detection model acquired with images each containing a head in a state where it matches preliminarily defined position and size in the defined image region as positive examples and with images each containing a head in a state where it does not match at least one of the preliminarily defined position and size in the defined image region as negative examples; at least one of an attribute determination model and an attribute determination rule for determining an attribute based on an image of the head;
a preliminary head detecting unit for cutting out the defined image region of the image to be detected as an image patch and detecting head images from the image to be detected by referring to the preliminary head detection model;
a definitive head detecting unit of detecting a definitive head image from plural head images acquired by the preliminary head detecting unit by referring to the definitive head detection model;
an attribute determining unit for determining an attribute based on the image of the head; and
an output unit for outputting a result of an attribute determination, wherein the image acquiring unit and the output unit are connected to the preliminary head detecting unit, the preliminary head detection model, the definitive head detecting unit, the definitive head detection model, the attribute determining unit, and at least one of the attribute determination model and the attribute determination rule via a communication network provided outside of the system.

Effects of the Invention

According to the present invention, a head detecting method, a head detecting apparatus, an attribute determining method, an attribute determining apparatus, a program, a recording medium, and an attribute determining system for detecting the head in an image correctly at high speed can be provided.

DESCRIPTION OF EMBODIMENTS

Next, Embodiments of the present invention will be described. Note here that the present invention is not limited or restricted by the following Embodiments. In the following FIGS. 1 to 6, identical parts are indicated with identical numerals and symbols.

Embodiment 1

Figure 1A:
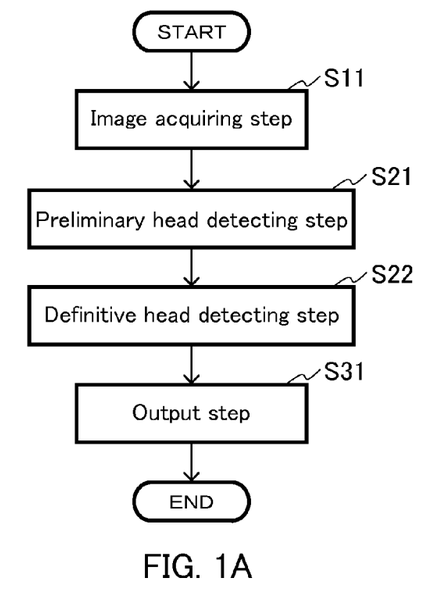
FIG. 1A is a flowchart showing an example (Embodiment 1) of the head detecting method of the present invention.
Figure 1B:
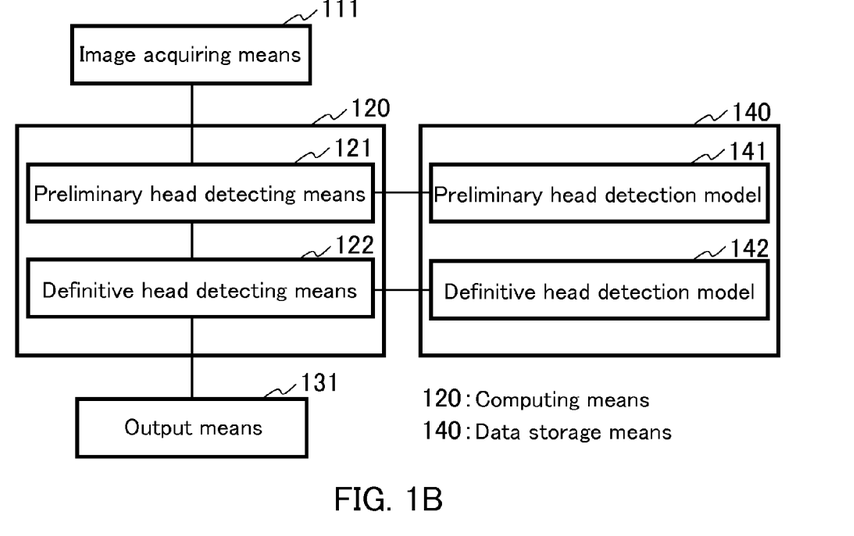
FIG. 1B is a block diagram showing the configuration of an example (Embodiment 1) of the head detecting apparatus of the present invention.

FIG. 1A shows a flowchart of the head detecting method of Embodiment 1. FIG. 1B shows a block diagram of the head detecting apparatus of Embodiment 1. As shown in FIG. 1B, the head detecting apparatus of Embodiment 1 includes image acquiring means (unit) 111, computing means (unit) 120, output means (unit) 131, and data storage means (unit) 140 as main components. The image acquiring means 111 is electrically connected to the computing means 120. The computing means 120 is electrically connected to the output means 131 and the data storage means 140. The computing means 120 includes preliminary head detecting means (unit) 121 and definitive head detecting means (unit) 122. Preliminarily acquired preliminary head detection model 141 and definitive head detection model 142 are stored in the data storage means 140. The preliminary head detecting means 121 is connected to the preliminary head detection model 141. The definitive head detecting means 122 is connected to the definitive head detection model 142.

Examples of the image acquiring means 111 include a charge coupled device (CCD) camera, a complementary metal oxide semiconductor (CMOS) camera, and an image scanner. An example of the computing means 120 includes a central processing unit (CPU). Examples of the output means 131 include a monitor outputting data by an image (for example, image displays such as a liquid crystal display (LCD) and a cathode-ray tube (CRT) display), a printer outputting data by printing, and a speaker outputting data by a sound. The output means 131 is an optional component. The head detecting apparatus of the present invention preferably includes the output means 131 although it is not always necessary. Examples of the data storage means 140 include a random access memory (RAM), a read-only memory (ROM), a hard disk (HD), an optical disk, and a floppy (registered trade name) disk (FD). The data storage means 140 may be, for example, a built-in type or an external type such as an external storage device. With respect to the image acquiring means, the computing means, the output means, and the data storage means, the same applies to the following Embodiments.

The head detecting method of Embodiment 1 is performed, for example, using the head detecting apparatus of FIG. 1B as follows.

Figure 2A:
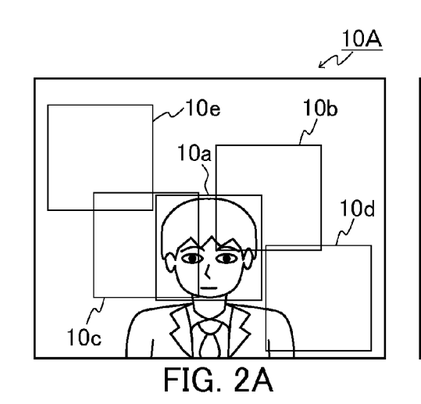
FIGS. 2A to 2F are views for explaining an example of the acquisition of the preliminary head detection model in the present invention.
Figure 2B:
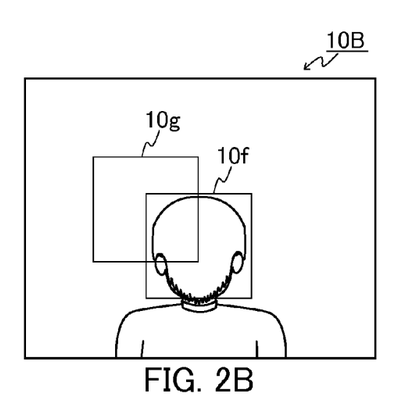
Figure 2C:
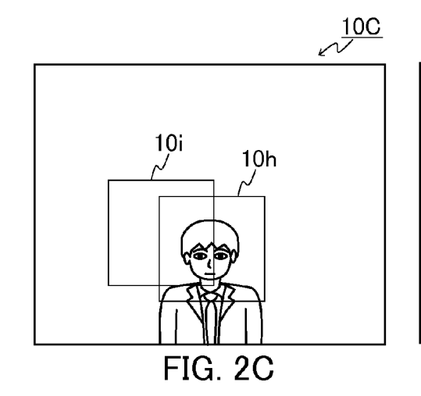
Figure 2D:
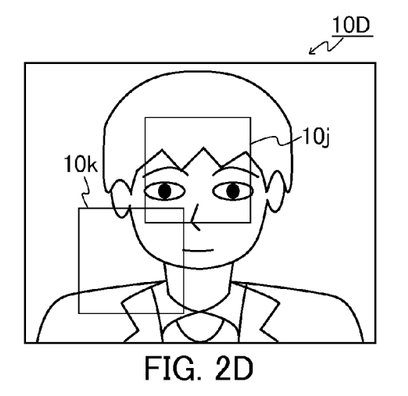
Figure 2E:
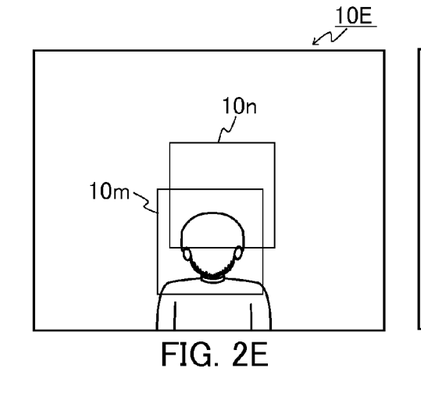
Figure 2F:
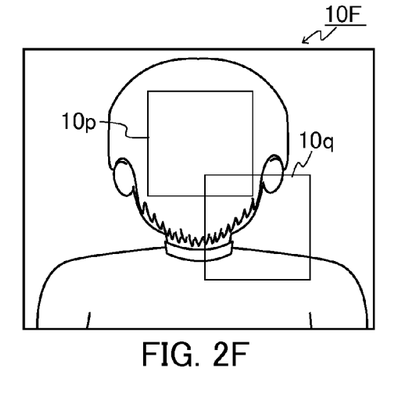

First, before performing the head detecting method, learning is performed using a machine learning (pattern recognition) technique. Specifically, first, a preliminary head detection model 141 is formed from images for learning by performing learning by machine learning (pattern recognition) with images each containing at least a part of the head in a defined image region defined preliminarily as positive examples and with images each not containing the head in the defined image region as negative examples. For example, as shown in FIG. 2A, in an image for learning (image showing a front-facing person) 10A, images 10a (entire head), 10b (upper right part of head), and 10c (left half of head), which are the images each containing at least a part of the head in a defined image region of a predetermined size (for example, 32×32 pixels) are classified into positive examples. On the other hand, images 10d (shoulder of person) and 10e (background), which are the images each not containing the head in the defined image region are classified into negative examples. For example, as shown in FIG. 2B, in an image for learning (image showing a rear-facing person) 10B, images 10f (entire head) and 10g (left half of head), which are the images each containing at least a part of the head in the defined image region are classified into positive examples. For example, as shown in FIG. 2C, in an image for learning (image showing a front-facing person in a quite small size) 10C, images 10h (entire head) and 10i (left half of head), which are the images each containing at least a part of the head in the defined image region are classified into positive examples. For example, as shown in FIG. 2D, in an image for learning (image showing a front-facing person in a quite large size) 10D, images 10j (entire head) and 10k (lower left part of head), which are the images each containing at least a part of the head in the defined image region are classified into positive examples. For example, as shown in FIG. 2E, in an image for learning (image showing a rear-facing person in a quite small size) 10E, images 10m (entire head) and 10n (upper half of head), which are the images each containing at least a part of the head in the defined image region are classified into positive examples. For example, as shown in FIG. 2F, in an image for learning (image showing a rear-facing person in a quite large size) 10F, images 10p (entire head) and 10q (lower right part of head), which are the images each containing at least a part of the head in the defined image region are classified into positive examples. In consideration of detection accuracy, for example, an image showing a side-facing person or the like is also preferably used as an image for learning. Further, the more the number of the images for learning, the better. For example, in the preliminary head detection model, an image showing something that can be mistakenly recognized as the head may be classified into a negative example. The formation of the preliminary head detection model 141 by the machine learning is performed, for example, as follows. First, a head region is applied to the head in an image for learning correctly such that deviations in size and position are not caused (annotation). Application of the head region is made by a person by inputting using conventionally known input means such as a keyboard, a mouse, or the like, for example. Next, an acceptable range is designated, for example, as follows: an image in which the position of the head is at a correct position in the head region and images in each of which the position of the head is deviated by not more than 50% from the correct position in the head region are classified into positive examples; an image in which the size of the head is a correct size in the head region and images in each of which the size of the head is not more than ±30% of the correct size in the head region are classified into positive examples; and the like. Then, the preliminary head detection model 141 is formed by automatically forming positive examples by a program.

On the other hand, the definitive head detection model 142 is formed by performing learning by machine learning (pattern recognition) with images each containing the head in a state where it matches preliminarily defined position and size in the defined image region as positive examples and with images each containing the head in a state where it does not match at least one of the preliminarily defined position and size as negative examples. Specifically, for example, images in each of which the head is positioned at nearly the center of the defined image region and the outline (size) of the head has approximately the same size as the defined image region are defined as positive examples. Next, among the images, 10a to 10c, 10f to 10k, 10m to 10n, and 10p to 10q, which are the positive examples of the formed preliminary head detection model 141, the images (10a and 10f) matching the aforementioned definition are classified into positive examples and the images (10b, 10c, 10g to 10k, 10m to 10n, and 10p to 10q) not matching the aforementioned definition are classified into negative examples. In this manner, since the images not matching the aforementioned definition among the images each containing the head detected as preliminaries are intensively classified into negative examples, for example, there is no need to perform learning with respect to all the images including images each not containing the head. Therefore, learning can be performed efficiently.

Next, as shown in the flowchart of FIG. 1A, the following steps are performed. First, an image to be detected is acquired by the image acquiring means 111 (step S11).

Figure 3A:
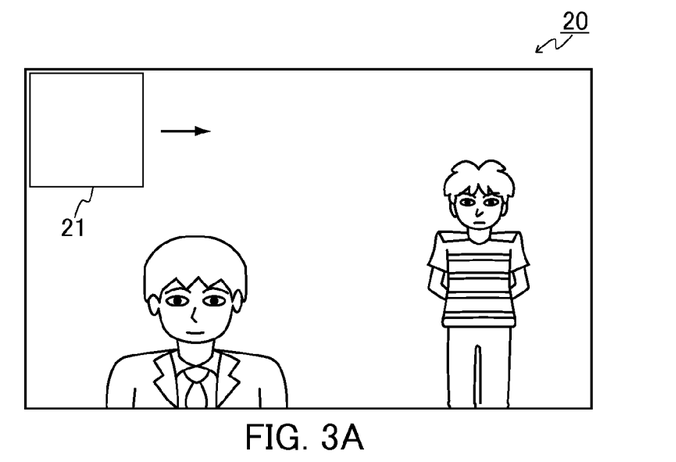
FIGS. 3A and 3B are views for explaining an example of the preliminary head detecting step in the head detecting method of Embodiment 1.
Figure 3B:
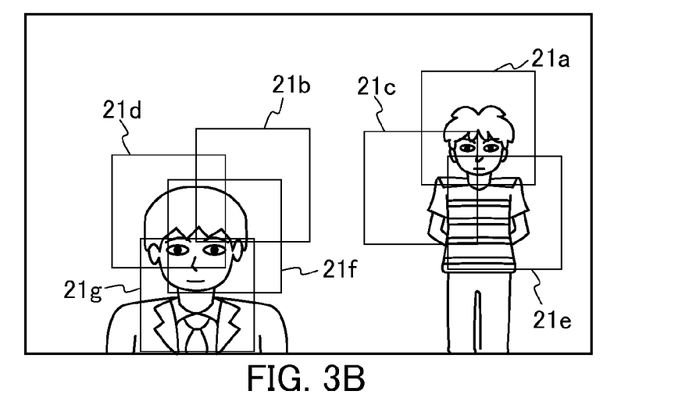

Next, by the preliminary head detecting means 121, the defined image region of the image to be detected is cut out as an image patch and head images are detected from the image to be detected by referring to the preliminary head detection model 141 preliminarily acquired (step S21). Specifically, for example, as shown in FIG. 3A, by referring to the preliminary head detection model 141 preliminarily acquired, the head images are searched by a so-called raster scanning by moving the image patch 21 in the horizontal direction from the upper left end of the image to be detected 20 and continuously moving downward in order. In this example, the travel amount (width) of the image patch is one-quarter of the whole image patch size. As a result, for example, as shown in FIG. 3B, head images 21a to 21g and the like are detected.

Figure 3C:
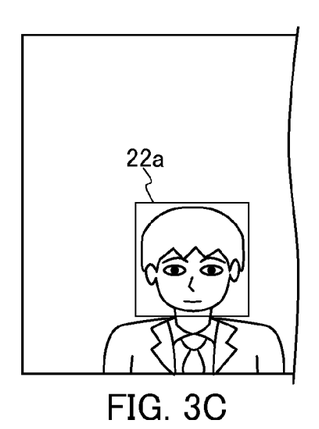
FIGS. 3C and 3D are views for explaining an example of the definitive head detecting step in the head detecting method of Embodiment 1.
Figure 3D:
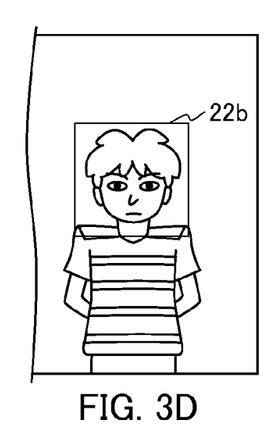

Next, among plural head images acquired in the preliminary head detecting step S21, a definitive head image is detected by the definitive head detecting means 122 by referring to the definitive head detection model 142 (step S22). Specifically, an area slightly larger than a range including the head images 21b, 21d, 21f, 21g, and the like (image containing the head of the person at the left side in FIG. 3B) acquired in the preliminary head detecting step S21 is used as an input image. From the input image, by performing raster scanning as well as downsizing the input image, as shown in FIG. 3C, the definitive head image 22a is detected by referring to the definitive head detection model 142. Further, an area slightly larger than a range including the head images 21a, 21c, and 21e, and the like (image containing the head of the person at the right side in FIG. 3B) acquired in the preliminary head detecting step S21 is used as an input image. From the input image, by performing raster scanning as well as downsizing the input image, as shown in FIG. 3D, the definitive head image 22b is detected by referring to the definitive head detection model 142.

Next, the detection result of the head is outputted by the output means 131 (step S31). The output step S31 is an optional step. The head detecting method of the present invention preferably includes the output step S31 although it is not always necessary.

In the technique for detecting a person described in Patent document 1, for not missing the head, scanning should be performed by finely shifting (for example, every 1 pixel) the image patch of a predetermined region and the size of the image should be reduced little by little (for example, ×0.95). This causes increase in processing time for detection. On the other hand, according to the head detecting method of Embodiment 1, first, images each containing at least a part of the head are detected from an image to be detected as preliminaries. Therefore, even when the travel amount of the image patch is large (for example, every 5 pixels) or the rate of change in the image size is large (for example, ×0.8), there is no possibility of missing the head. Accordingly, candidates in the image to be detected can be detected at high speed by the head detecting method of Embodiment 1. Next, among the candidate images of the head detected as preliminaries, a definitive head image is detected. Therefore, the definitive head detection also can be performed at high speed. Accordingly, the head in the image to be detected can be detected correctly at high speed by the head detecting method of Embodiment 1. With respect to these effects, the same applies to the Embodiments described below.

Embodiment 2

Figure 4A:
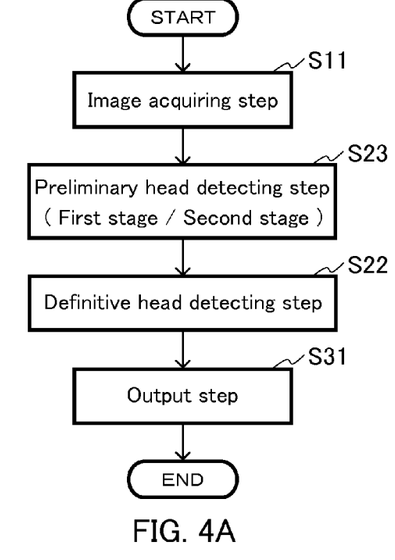
FIG. 4A is a flowchart showing another example (Embodiment 2) of the head detecting method of the present invention.
Figure 4B:
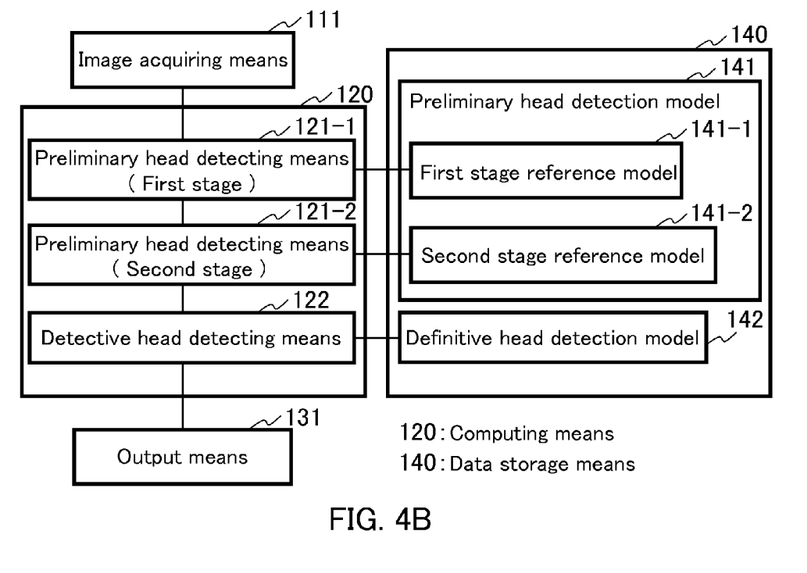
FIG. 4B is a block diagram showing the configuration of another example (Embodiment 2) of the head detecting apparatus of the present invention.

FIG. 4A is a flowchart showing the head detecting method of Embodiment 2. FIG. 4B is a block diagram showing the head detecting apparatus of Embodiment 2. As shown in FIG. 4B, in the head detecting apparatus of Embodiment 2, the computing means 120 includes preliminary head detecting means (unit) (the first stage) 121-1 and preliminary head detecting means (unit) (the second stage) 121-2 instead of the preliminary head detecting means 121, and the preliminary head detection model 141 in the data storage means 140 includes a first stage reference model 141-1 and a second stage reference model 141-2. The preliminary head detecting means (the first stage) 121-1 is connected to the first stage reference model 141-1. The preliminary head detecting means (the second stage) 121-2 is connected to the second stage reference model 141-2. The configuration of Embodiment 2 other than these is the same as that of the head detecting apparatus of Embodiment 1 shown in FIG. 1B.

The head detecting method of Embodiment 2 is performed, for example, using the head detecting apparatus of FIG. 4B as follows.

First, before performing the head detecting method, learning is performed using a machine learning (pattern recognition) technique. That is, the preliminary head detection model 141 including the first stage reference model 141-1 and the second stage reference model 141-2 is formed by performing learning by machine learning (pattern recognition). Specifically, for example, first, in the first stage reference model 141-1, in the same manner as the formation of the preliminary head detection model 141 in Embodiment 1, in images for learning 10A to 10F shown in FIGS. 2A to 2F, images 10a to 10c, 10f to 10k, 10m to 10n, and 10p to 10q, which are the images each containing at least a part of the head in a defined image region of a predetermined size are classified into positive examples. On the other hand, images 10d and 10e, which are the images each not containing the head in the defined image region are classified into negative examples. Next, in the second stage reference model 141-2, the images satisfying the following conditions are defined as positive examples. The conditions are as follows: images in each of which the head is positioned at nearly the center of the defined image region and images in each of which the head is deviated by not more than about 50% from the center of the defined image region; and images in each of which the outline (size) of the head is substantially the same as the size of the defined image region and images in each of which the size of the head is larger than a half the size of the defined image region. Among images 10a to 10c, 10f to 10k, 10m to 10n, and 10p to 10q, which are the positive examples of the first stage reference model 141-1 formed, the images (10a, 10c, 10f, 10h, 10i, 10m, and 10n) matching the aforementioned definition are classified into positive examples and the images (10b, 10g, 10j, 10k, 10p, and 10q) not matching the aforementioned definition are classified into negative examples.

In this example, in the first stage reference model, the images each containing at least a part of the head in the image for learning are classified into positive examples. However, the present invention is not limited thereto. For example, positive examples may be defined by designating a predetermined acceptable range with respect to correct position and size in the head region. Further, in the second stage reference model, the images satisfying the both conditions for the position and size of the head are classified into positive examples. However, the present invention is not limited thereto. For example, the images satisfying one of the position and size of the head may be classified into positive examples. Accordingly, in the first stage reference model 141-1, for example, the positive examples may be defined by designating the acceptable range as follows: an image in which the position of the head in the image for learning is at a correct position in the head region and images in each of which the position of the head in the image for learning is deviated by not more than 50% from the correct position in the head region are classified into positive examples; an image in which the size of the head is a correct size in the head region and images in each of which the size of the head is not more than ±30% of the correct size in the head region are classified into positive examples; and the like. In the second stage reference model 141-2, for example, the positive examples may be defined by designating the acceptable range as follows: an image in which the position of the head is at a correct position in the head region and images in each of which the position of the head in the image for learning is deviated by not more than 25% from the correct position in the head region are classified into positive examples; an image in which the size of the head is a correct size in the head region and images in each of which the size of the head is not more than ±15% of the correct size in the head region are classified into positive examples; and the like.

On the other hand, the definitive head detection model 142 is formed in the same manner as in Embodiment 1. Specifically, for example, images in each of which the head is positioned at nearly the center of the defined image region and the outline (size) of the head has approximately the same size as the defined image region are defined as positive examples. Among the images, 10a, 10c, 10f, 10h, 10i, 10m, and 10n, which are the positive examples of the formed second stage reference model 141-2, the images (10a and 10f) matching the aforementioned definition are classified into positive examples and the images (10c, 10h, 10i, 10m, and 10n) not matching the aforementioned definition are classified into negative examples.

Next, as shown in the flowchart of FIG. 4A, the following steps are performed. First, an image to be detected is acquired by the image acquiring means 111 (step S11).

Next, by the preliminary head detecting means, the defined image region of the image to be detected is cut out as an image patch and head images are detected in stages (two stages, namely the first stage and the second stage) from the image to be detected by referring to the first stage reference model 141-1 and the second stage reference model 141-2 preliminarily acquired (step S23). Specifically, first, as the first stage, by the preliminary head detecting means (the first stage) 121-1, by referring to the first stage reference model 141-1 preliminarily acquired, in the same manner as the preliminary head detecting step S21 in Embodiment 1, as shown in FIG. 3B, the head images 21a to 21g and the like are detected by searching head images from the image to be detected 20 shown in FIG. 3A. Next, as the second stage, among the acquired images 21a to 21g, by referring to the second stage reference model 141-2 preliminarily acquired, the head images 21a, 21d, 21f, and 21g are detected.

Next, in the same manner as in Embodiment 1, among plural head images acquired in the preliminary head detecting step S23, a definitive head image is detected by the definitive head detecting means 122 by referring to the definitive head detection model 142 (step S22). Specifically, an area slightly larger than a range including the head images 21d, 21f, 21g, and the like (image containing the head of the person at the left side in FIG. 3B) acquired in the preliminary head detecting step S23 is used as an input image. From the input image, by performing raster scanning as well as downsizing the input image, as shown in FIG. 3C, the definitive head image 22a is detected by referring to the definitive head detection model 142. Further, an area slightly larger than a range including the head images 21a and the like (image containing the head of the person at the right side in FIG. 3B) acquired in the preliminary head detecting step S23 is used as an input image. From the input image, by performing raster scanning as well as downsizing the input image, as shown in FIG. 3D, the definitive head image 22b is detected by referring to the definitive head detection model 142.

Next, in the same manner as in Embodiment 1, the detection result of the head is outputted by the output means 131 (step S31).

In the head detecting method of Embodiment 2, as described above, by referring to the reference models of two stages, in the preliminary head detecting step, the detection of head is performed in two stages. Therefore, the head in the image to be detected can be detected more correctly at higher speed.

In the head detecting method of Embodiment 2, the reference models of two stages are employed and the preliminary head detecting step is performed corresponding thereto. However, the present invention is not limited thereto. Reference models of three or more stages may be employed and the preliminary head detecting step may be performed corresponding thereto.

Embodiment 3

Figure 5A:
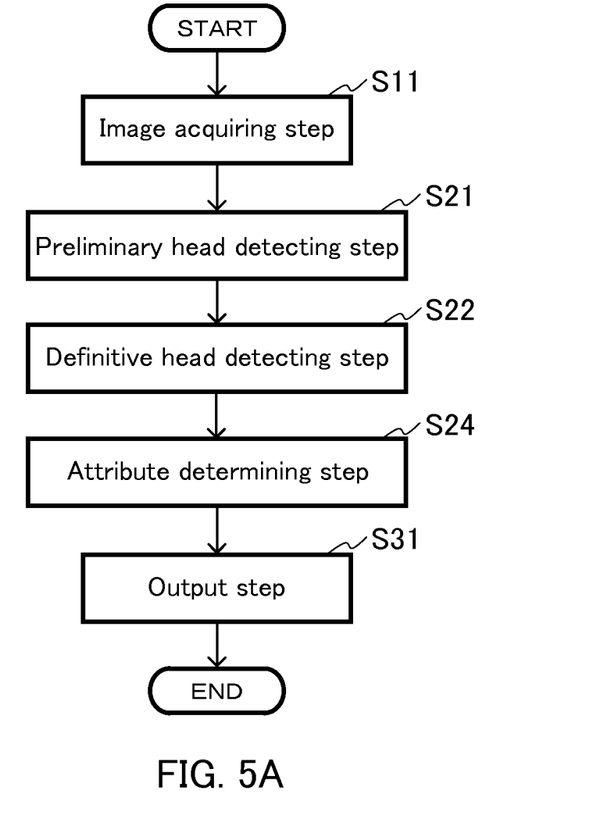
FIG. 5A is a flowchart showing an example (Embodiment 3) of the attribute determining method of the present invention.
Figure 5B:
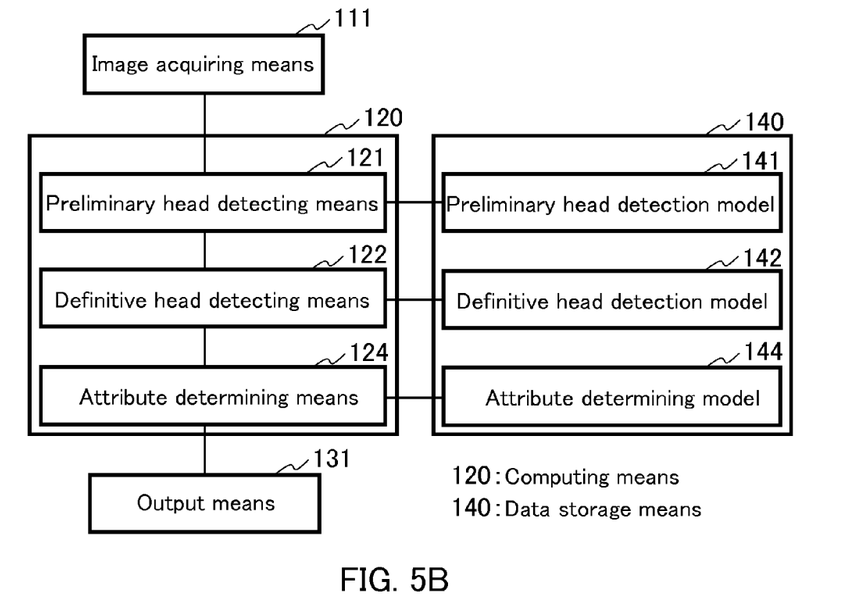
FIG. 5B is a block diagram showing the configuration of an example (Embodiment 3) of the attribute determining apparatus of the present invention.

FIG. 5A shows a flowchart of the attribute determining method of Embodiment 3. FIG. 5B shows a block diagram of the attribute determining apparatus of Embodiment 3. As shown in FIG. 5B, the attribute determining apparatus of Embodiment 3 includes image acquiring means (unit) 111, computing means (unit) 120, output means (unit) 131, and data storage means (unit) 140 as main components. The image acquiring means 111 is electrically connected to the computing means 120. The computing means 120 is electrically connected to the output means 131 and the data storage means 140. The computing means 120 includes preliminary head detecting means (unit) 121, definitive head detecting means (unit) 122, and attribute determining means (unit) 124. Preliminarily acquired preliminary head detection model 141, definitive head detection model 142, and attribute determination model 144 are stored in the data storage means 140. The preliminary head detecting means 121 is connected to the preliminary head detection model 141. The definitive head detecting means 122 is connected to the definitive head detection model 142. The attribute determining means 124 is connected to the attribute determination model 144. The image acquiring means 111, the preliminary head detecting means 121, and the definitive head detecting means 122 in total in the attribute determining apparatus of Embodiment 3 correspond to the "head detecting means" in the present invention.

In the present invention, there is no particular limitation on an attribute, and examples of the attribute include a gender, an age, a race, the direction of the head, a hairstyle, the length of the hair, and with or without a hat.

The attribute determining method of Embodiment 3 is performed, for example, using the attribute determining apparatus of FIG. 5B as follows.

First, before performing the attribute determining method, learning is performed using a machine learning (pattern recognition) technique. That is, in the same manner as in Embodiment 1, the preliminary head detection model 141 and the definitive head detection model 142 are formed. Specifically, for example, in the same manner as in Embodiment 1, head images 10a and the like in an image for learning 10A in FIG. 2A are classified into positive examples in the definitive head detection model 142.

On the other hand, using many head images to each of which training data (or attribute value) is applied, the attribute determination model 144 is formed by machine learning (pattern recognition). In the attribute determining method of Embodiment 3, examples of the training data (attribute value) include a gender and an age. Specifically, for example, training data (attribute value) such as "gender: male and age: 30" is applied to the head images 10a and the like in the image for learning 10A shown in FIG. 2A. Application of the training data (attribute value) such as a gender and an age is made by a person by inputting using conventionally known input means such as a keyboard, a mouse, or the like, for example. Then, using the head images 10a and the like to each of which the training data (or attribute value) is applied, the attribute determination model 144 is formed.

Next, as shown in the flowchart of FIG. 5A, the following steps are performed. First, an image to be detected is acquired by the image acquiring means 111 (step S11).

Next, in the same manner as in Embodiment 1, by the preliminary head detecting means 121, the defined image region of the image to be detected is cut out as an image patch and head images are detected from the image to be detected by referring to the preliminary head detection model 141 preliminarily acquired (step S21).

Next, in the same manner as in Embodiment 1, among plural head images acquired in the preliminary head detecting step S21, a definitive head image is detected by the definitive head detecting means 122 by referring to the definitive head detection model 142 (step S22). Specifically, for example, in the same manner as in Embodiment 1, as shown in FIGS. 3C and 3D, the definitive head images 22a and 22b are detected. The image acquiring step S11, the preliminary head detecting step S21, and the definitive head detecting step S22 in total correspond to the "head detecting step" in the present invention.

Next, an attribute is determined based on the image of the head by the attribute determining means 124 by referring to the attribute determination model 144 acquired preliminarily (step S24). Examples of the determination item include a gender, an age, the direction of the head, a hairstyle, the length of the hair, and with or without a hat. In the case where the determination item is a gender, for example, the determination can be made based on a gender degree (for example, 0 to 1). The gender degree can be calculated based on the head image, for example. Specifically, for example, a criterion is set as follows. That is, it is determined as the "female" if the gender degree is "0 to less than 0.5" and it is determined as the "male" if the gender degree is "0.5 to 1". Determination of the gender is performed from the value of the calculated gender degree. Also with respect to the age and the like, for example, by setting predetermined criteria, determination of the age and the like are performed from the values calculated based on the head images.

Next, the determination result of the attribute is outputted by the output means 131 (step S31). Examples of the determination item are the same as those described above. The output step S31 is an optional step. The attribute determining method of the present invention preferably includes the output step S31 although it is not always necessary.

As described above, in the attribute determining method of Embodiment 3, the head is detected by the head detecting method of Embodiment 1 and the determination of the attribute is performed based on the image of the head. Therefore, the determination of the attribute can be performed correctly at high speed.

Figure 5C:
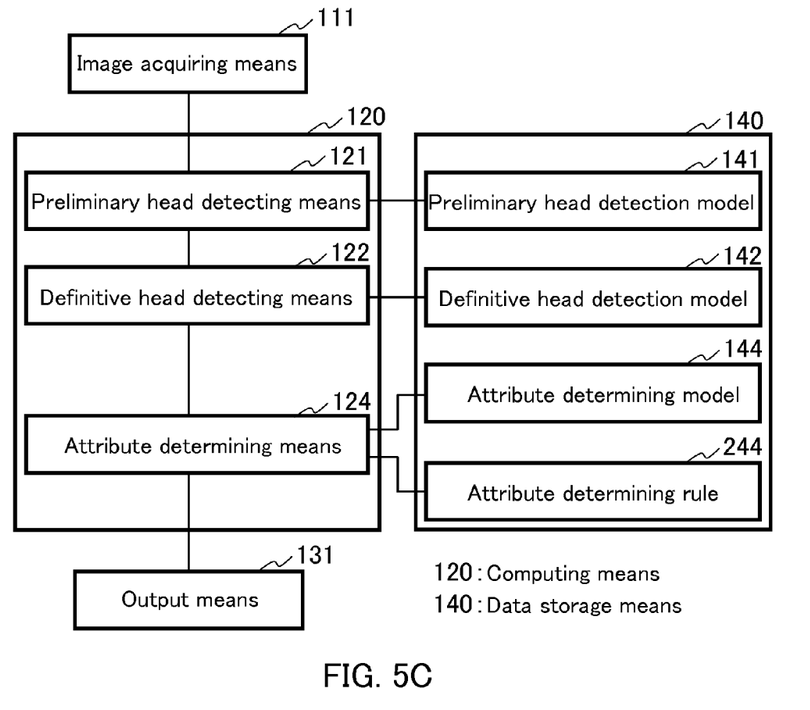
FIG. 5C is a block diagram showing another example of the attribute determining apparatus of Embodiment 3.

In the attribute determining step (S24 in FIG. 5A) in the attribute determining method of Embodiment 3, the determination of the attribute is performed based on the image of the head by referring to the attribute determination model. However, the present invention is not limited thereto. The determination of the attribute may be performed by referring to an attribute determination rule, for example. An example of the attribute determination rule includes the rule such as "it is determined as a male if the hair is short and it is determined as a female if the hair is long". Furthermore, for example, the determination of the attribute may be performed by referring to both the attribute determination model and the attribute determination rule. In this case, for example, as shown in FIG. 5C, an attribute determination rule 244 may be stored in the data storage means 140 and the attribute determining means 124 may be connected to the attribute determination rule 244.

The preliminary head detecting step in the attribute determining method of Embodiment 3 may be performed in stages in the same manner as in the preliminary head detecting step in the head detecting method of Embodiment 2, for example. In this case, the preliminary head detection model of the attribute determining apparatus includes, for example, the multistage reference models. This makes it possible to perform a correct attribute determination at higher speed.

Embodiment 4

The program of Embodiment 4 is a program that allows a computer to execute the head detecting method or the attribute determining method. The program of Embodiment 4 may be recorded, for example, in a recording medium. There is no particular limitation on the recording medium, and examples of the recording medium include a random access memory (RAM), a read-only memory (ROM), a hard disk (HD), an optical disk, and a floppy (registered trade mark) disk (FD).

Embodiment 5

Figure 6:
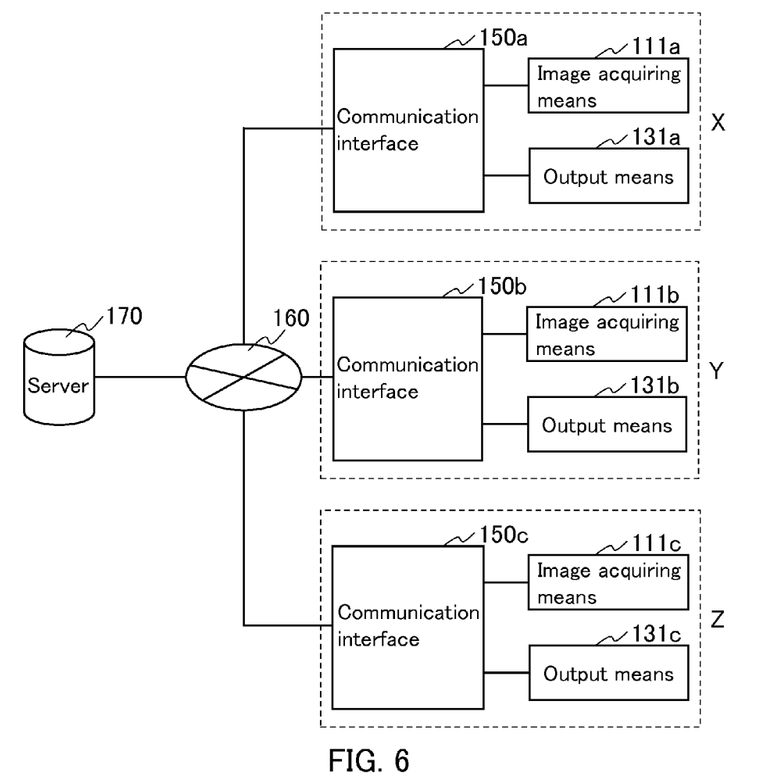
FIG. 6 is a block diagram showing the configuration of an example (Embodiment 5) of the attribute determining system using the attribute determining apparatus of the present invention.

FIG. 6 shows the configuration of an example of the attribute determining system using the attribute determining apparatus of the present invention. As shown in FIG. 6, the attribute determining system is provided with image acquiring means (units) 111a, 111b, and 111c; output means (units) 131a, 131b, and 131c; communication interfaces 150a, 150b, and 150c; and a server 170. The image acquiring means 111a and the output means 131a are connected to the communication interface 150a. The image acquiring means 111a, the output means 131a, and the communication interface 150a are arranged at the site "X". The image acquiring means 111b and the output means 131b are connected to the communication interface 150b. The image acquiring means 111b, the output means 131b, and the communication interface 150b are arranged at the site "Y". The image acquiring means 111c and the output means 131c are connected to the communication interface 150c. The image acquiring means 111c, the output means 131c, and the communication interface 150c are arranged at the site "Z". The communication interfaces 150a, 150b, and 150c are connected to the server 170 via a network 160.

This attribute determining system includes preliminary head detecting means, definitive head detecting means, and attribute determining means at the server 170 side, and a preliminary head detection model, a definitive head detection model, and an attribute determination model are stored in the server 170. For example, an image to be detected acquired at the site "X" using the image acquiring means 111a is sent to the server 170, the head is detected at the server 170 side, and the determination of the attribute is performed based on the image of the head. Then, the determined attribute is outputted by the output means 131a. For example, the attribute determination rule also may be stored in the server.

According to the attribute determining system of Embodiment 5, by arranging the image acquiring means and the output means on-site and arranging the server and the like at other sites, the head detection and attribute determination can be performed online. Therefore, for example, the system does not require a space for arranging devices and maintenance is not complicated. Furthermore, for example, even in a case where the sites at which the devices are set are distanced from one another, the system can be controlled centrally or remotely. The attribute determining system of Embodiment 5 may be the system corresponding to the multistage detection of Embodiment 2. Furthermore, the attribute determining system of Embodiment 5 may be, for example, the system corresponding to cloud computing.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-149934 filed on Jun. 30, 2010, the disclosure of which is incorporated herein in its entirety by reference.

INDUSTRIAL APPLICABILITY

According to the present invention, a head detecting method, a head detecting apparatus, an attribute determining method, an attribute determining apparatus, a program, a recording medium, and an attribute determining system for detecting the head in an image correctly at high speed can be provided, and the present invention can be applied to a wide range of fields.

EXPLANATION OF REFERENCE NUMERALS 10A, 10B, 10C, 10D, 10E, and 10F image for learning
10a, 10b, 10c, 10d, 10e, 10f, 10g, 10h, 10i, 10j, 10k, 10m, 10n, 10p, and 10q image in defined image region
20 and 70 image to be detected
21 and 71 image patch
21a, 21b, 21c, 21d, 21e, 21f, and 21g head image
22a and 22b definitive head image
111, 111a, 111b, and 111c image acquiring means
120 computing means
121 preliminary head detecting means
121-1 preliminary head detecting means (first stage)
121-2 preliminary head detecting means (second stage)
122 definitive head detecting means
124 attribute determining means
131, 131a, 131b, and 131c output means
140 data storage means
141 preliminary head detection model
141-1 first stage reference model
141-2 second stage reference model
142 definitive head detection model
144 attribute determination model
150a, 150b, and 150c communication interface
160 network
170 server
244 attribute determination rule

The invention claimed is:

1. A head detecting method using: a preliminary head detection model acquired with images each containing at least a part of a head in a defined image region defined preliminarily as positive examples and with images each not containing a head in the defined image region as negative examples; and a definitive head detection model acquired with images each containing a head in a state where it matches preliminarily defined position and size in the defined image region as positive examples and with images each containing a head in a state where it does not match at least one of the preliminarily defined position and size in the defined image region as negative examples, the method comprising:
   an image acquiring step of acquiring an image to be detected;
   a preliminary head detecting step of cutting out the defined image region of the image to be detected as an image patch and detecting head images from the image to be detected by referring to the preliminary head detection model; and
   a definitive head detecting step of detecting a definitive head image from plural head images acquired in the preliminary head detecting step by referring to the definitive head detection model.

2. The method according to claim 1, wherein the preliminary head detection model includes multistage reference models acquired, by defining matching degrees in stages to the preliminarily defined position and size in the definitive head detection model, with images each matching the preliminarily defined position and size as positive examples and with images each not matching the preliminarily defined position and size as negative examples,
in the preliminary head detecting step, detection of head is performed in stages in accordance with each stage of the multistage preliminary head detection models, and
a head image of a current stage is detected from plural head images acquired in the former stages.

3. A head detecting apparatus, comprising:
   a preliminary head detection model acquired with images each containing at least a part of a head in a defined image region defined preliminarily as positive examples and with images each not containing a head in the defined image region as negative examples;
   a definitive head detection model acquired with images each containing a head in a state where it matches preliminarily defined position and size in the defined image region as positive examples and with images each containing a head in a state where it does not match at least one of the preliminarily defined position and size in the defined image region as negative examples;
   an image acquiring unit for acquiring an image to be detected;
   a preliminary head detecting unit for cutting out the defined image region of the image to be detected as an image patch and detecting head images from the image to be detected by referring to the preliminary head detection model; and
   a definitive head detecting unit of detecting a definitive head image from plural head images acquired by the preliminary head detecting unit by referring to the definitive head detection model.

4. The apparatus according to claim 3, wherein the preliminary head detection model includes multistage reference models acquired, by defining matching degrees in stages to the preliminarily defined position and size in the definitive head detection model, with images each matching the preliminarily defined position and size as positive examples and with images each not matching the preliminarily defined position and size as negative examples,
the preliminary head detecting unit performs multistage detection of head in accordance with each stage of the multistage preliminary head detection models, and
a head image of a current stage is detected from plural head images acquired in the former stages.

5. An attribute determining method, comprising:
   a head detecting step of detecting a head by the head detecting method according to claim 1; and
   an attribute determining step of determining an attribute based on an image of the head.

6. The method according to claim 5, wherein, in the attribute determining step, an attribute is determined based on the image of the head by referring to at least one of an attribute determination model acquired preliminarily and an attribute determination rule.

7. An attribute determining apparatus, comprising:
   a head detecting unit for detecting a head by the head detecting apparatus according to claim 3; and
   an attribute determining unit for determining an attribute based on an image of the head.

8. The apparatus according to claim 7, wherein the attribute determining unit determines an attribute based on the image of the head by referring to at least one of an attribute determination model acquired preliminarily and an attribute determination rule.

9. A non-transitory recording medium comprising a program, wherein a computer is caused to execute the head detecting method according to claim 1.

10. A non-transitory recoding medium comprising a program, wherein a computer is caused to execute the attribute determining method according to claim 5.

11. A non-transitory recording medium being recorded with the program according to claim 9.

12. An attribute determining system, comprising:
- an image acquiring unit for acquiring an image to be detected,
- a preliminary head detection model acquired with images each containing at least a part of a head in a defined image region defined preliminarily as positive examples and with images each not containing a head in the defined image region as negative examples;
- a definitive head detection model acquired with images each containing a head in a state where it matches preliminarily defined position and size in the defined image region as positive examples and with images each containing a head in a state where it does not match at least one of the preliminarily defined position and size in the defined image region as negative examples;
- at least one of an attribute determination model and an attribute determination rule for determining an attribute based on an image of the head;
- a preliminary head detecting unit for cutting out the defined image region of the image to be detected as an image patch and detecting head images from the image to be detected by referring to the preliminary head detection model;
- a definitive head detecting unit of detecting a definitive head image from plural head images acquired by the preliminary head detecting unit by referring to the definitive head detection model;
- an attribute determining unit for determining an attribute based on the image of the head; and
- an output unit for outputting a result of an attribute determination, wherein the image acquiring unit and the output unit are connected to the preliminary head detecting unit, the preliminary head detection model, the definitive head detecting unit, the definitive head detection model, the attribute determining unit, and at least one of the attribute determination model and the attribute determination rule via a communication network provided outside of the system.

\* \* \* \* \*

UNITED STATES PATENT AND TRADEMARK OFFICE
CERTIFICATE OF CORRECTION

PATENT NO.        : 8,917,915 B2                                     Page 1 of 1
APPLICATION NO.   : 13/807677
DATED             : December 23, 2014
INVENTOR(S)       : Ueki It is certified that error appears in the above-identified patent and that said Letters Patent is hereby corrected as shown below:

In the Claims

Column 15, Line 1 Claim 10, delete "recoding" and insert -- recording --

Signed and Sealed this
Twenty-fifth Day of August, 2015

Michelle K. Lee
*Director of the United States Patent and Trademark Office*